United States Patent [19]

Mizusawa

[11] 4,346,941
[45] Aug. 31, 1982

[54] HYDRAULIC PRESSURE CONTROL VALVE DEVICE OF HYDRAULIC BRAKE SYSTEM FOR VEHICLES

[75] Inventor: Mitutoyo Mizusawa, Ueda, Japan

[73] Assignee: Nissin Kogyo Kabushiki Kaisha, Ueda, Japan

[21] Appl. No.: 181,845

[22] Filed: Aug. 27, 1980

[30] Foreign Application Priority Data

Aug. 30, 1979 [JP] Japan .................................. 54-110630

[51] Int. Cl.³ ............................................ B60T 8/26
[52] U.S. Cl. .................................... 303/6 C; 188/349
[58] Field of Search .................. 303/6 C, 84 A, 84 R, 303/6 R, 22 R, 22 A; 188/349, 345, 195, 151 A

[56] References Cited

U.S. PATENT DOCUMENTS 3,970,347  7/1976  Mizusawa ........................... 303/6 C
4,198,099  4/1980  Oberthür ............................ 303/6 C

FOREIGN PATENT DOCUMENTS 2018921  10/1979  United Kingdom ............... 303/6 C

*Primary Examiner*—Douglas C. Butler
*Attorney, Agent, or Firm*—Armstrong, Nikaido, Marmelstein & Kubovcik

[57] ABSTRACT

An improved hydraulic pressure control valve device includes a valve housing having first and second inlet ports of the master cylinder, respectively, first and second inlet ports communicated with the left and right rear wheel brakes of the vehicle, respectively, a first control pressure chamber interconnecting the first inlet port and the first outlet port, a second control pressure chamber interconnecting the second inlet port and the second outlet port, and a cylinder bore interconnecting the first and the second outlet ports; a pressure reducing valve adapted to normally open the first control pressure chamber and to open and close the first control pressure chamber as the pressure at the first inlet port exceeds a predetermined level so as to transmit the pressure to the first outlet port while proportionally reducing the pressure; a cut-off valve adapted to normally open the second control pressure chamber in the normal state, a valve rod integrally connected to the reducing valve to operate the cut-off valve so that is closes the second control pressure chamber just before the closing of the pressure reducing valve; and a balance piston slidably fitting in the cylinder bore and adapted to move, when the pressure at the first outlet port is higher than that at the second outlet port, in the direction for achieving an equilibrium of these pressures.

5 Claims, 2 Drawing Figures

4,346,941

HYDRAULIC PRESSURE CONTROL VALVE DEVICE OF HYDRAULIC BRAKE SYSTEM FOR VEHICLES

BACKGROUND OF THE INVENTION

The present invention relates to a hydraulic pressure controller of a dual hydraulic braking system for vehicles, particularly for four-wheeled motorcars.

A known hydraulic pressure controller of this type incorporates a first pressure reducing valve and a second pressure reducing valve disposed in respective independent oil passages which connect a first output port and a second output port of a master cylinder with respective left and right rear wheel brakes, the first and second pressure reducing valves being adapted to transmit the output hydraulic pressures from the first and the second output ports to respective rear wheel brakes while proportionally reducing the pressure. The pressure reducing valves incorporate respective piston valves which are contacted at their one end by a balancing lever which in turn is urged by a common spring for determining the pressures at which the piston valves commence the pressure reducing action.

In the device described above, when proper oil pressures are maintained in two systems, both piston valves are operated overcoming the set load of the spring, in accordance with the rise of the output oil pressure of the master cylinder, so that the above-mentioned output pressure is reduced proportionally and transmitted to the left and right rear wheels. This prevents the locking of the rear wheels attributable to the reduction of the load on the rear wheels during braking.

In the above-described device, however, it is necessary to incorporate two expensive reducing valves. In addition, a complicated mechanism for attaining the balance of pressures for both rear wheels is required, so that the cost of the device as a whole is raised inconveniently.

SUMMARY OF THE INVENTION

Under these circumstances, the present invention aims at providing a comparatively simple hydraulic pressure controlling valve device in which only one expensive pressure reducing valve is installed in one of the two oil supplying systems while a simple cut-off valve interposed in the other system is controlled by an efficient use of the characteristic of the pressure reducing valve. In this manner, the output pressure of the master cylinder is transmitted through a proportional reduction also in the other system while attaining a balance of the braking hydraulic pressure between two rear wheels.

The above and other objects, as well as advantageous features of the invention will become clear from the following description of the preferred embodiments taken in conjunction with the accompanying drawings.

DESCRIPTION OF THE PREFERRED EMBODIMENT

A preferred embodiment of the invention will be described hereinunder with reference to the accompanying drawings.

Figure 1:
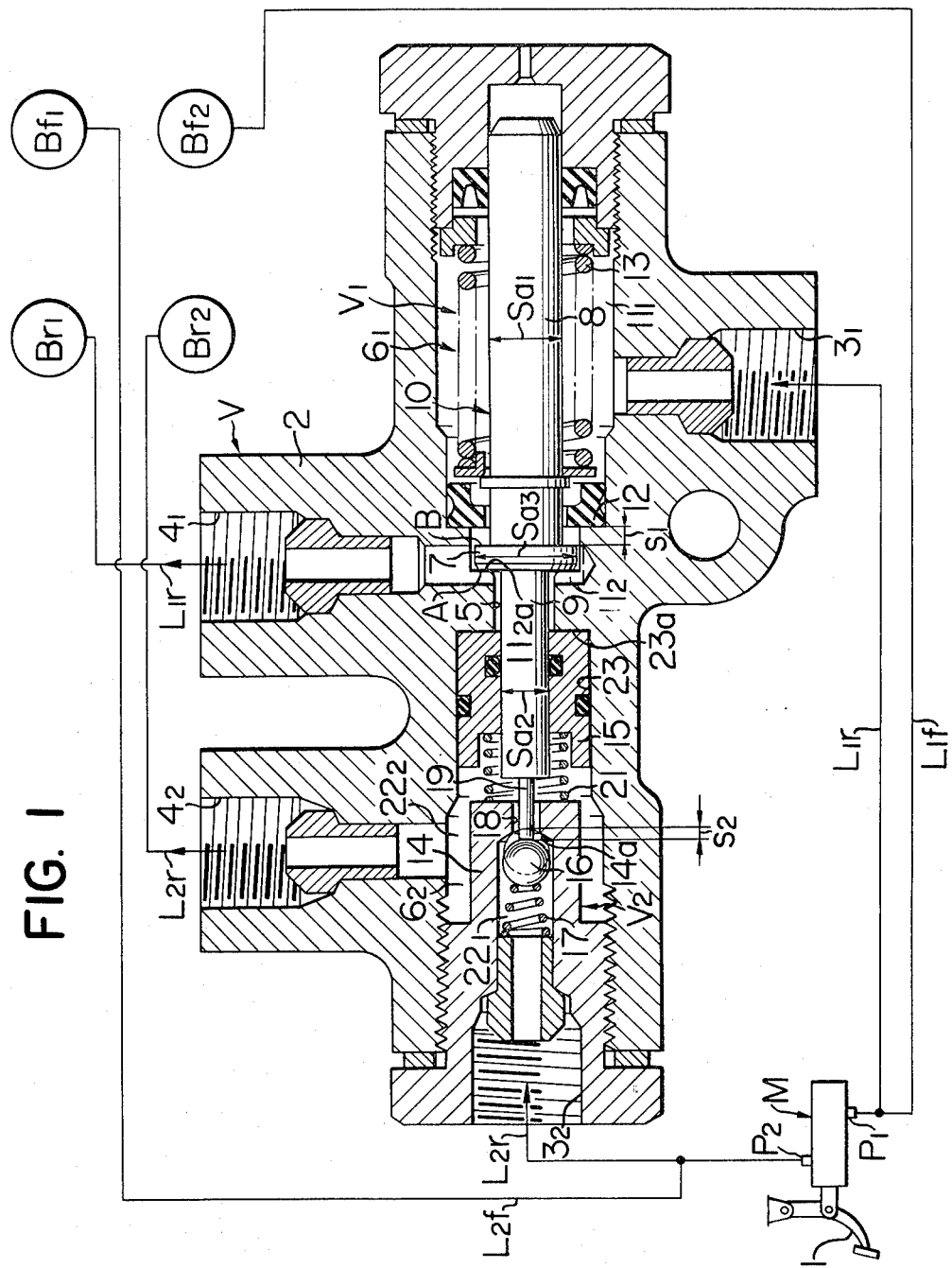
FIG. 1 is a vertical sectional front elevational view of an embodiment of the invention.

Referring to FIG. 1, a reference symbol M represents a tandem master cylinder which is known per se and adapted to be actuated by a brake pedal 1. The left and right rear wheel brakes and the left and right front wheel brakes are represented by $Br_1, Br_2$ and $Bf_1, Bf_2$, respectively. A first output port $P_1$ of the master cylinder M is connected to the right front wheel brake $Bf_2$ and the left rear wheel brake $Br_1$, respectively, through oil passages $L_1f$ and $L_1r$. On the other hand, a second output port $P_2$ is connected to the left front wheel brake $Bf_1$ and right rear wheel brake $Br_2$ through oil passages $L_2f$ and $L_2R$. In order to control the braking hydraulic pressure in the rear wheel brakes $Br_1$ and $Br_2$, a pressure control valve device V of the invention is disposed in the above-mentioned oil passages $L_1r$ and $L_2r$.

To the outside of the housing 2 of the control valve device V, opened are a first inlet port $3_1$ connected to a point in the oil passage $L_1r$ adjacent to the master cylinder M and a first outlet port $4_1$ connected to a point in the same oil passage downstream from the first-mentioned point, i.e. to a point adjacent to the left rear wheel brake $Br_1$, as well as a second inlet port $3_2$ and a second outlet port $4_2$ which are connected to an upstream and a downstream portion of the oil passage $L_2r$. A first control pressure chamber $6_1$ is interposed between the first inlet port $3_1$ and the first outlet port $4_1$, while a second control pressure chamber $6_2$ is provided between the second inlet port $3_2$ and the second outlet port $4_2$.

A piston valve 10 constituted by a pressure receiving piston 7, a large-diameter valve rod 8 projecting from one end surface of the pressure receiving piston 7 and a small diameter valve rod 9 extending from the other end surface of the piston 7 is disposed in the first control pressure chamber $6_1$. There is a relationship expressed by $Sa_1 \div 2 \times Sa_2$ between the sectional area $Sa_1$ of the large-diameter valve rod 8 and the sectional area $Sa_2$ of the small-diameter valve rod 9.

Therefore, if the cross-sectional area of the pressure receiving piston 7 is represented by $Sa_3$, the pressure receiving area A $(Sa_3-Sa_2)$ of the piston 7 at the same side as the small-diameter valve rod 9 is greater than the pressure receiving area B $(Sa_3-Sa_1)$ at the same side as the large-diameter valve rod 8.

The first control pressure chamber 6 is divided by a resilient valve seat 12 such as of rubber into an input oil pressure chamber $11_1$ communicating with the first inlet port $3_1$ and an outlet oil pressure chamber $11_2$ communicating with the first outlet port $4_1$. The aforementioned pressure receiving piston 7 of the piston valve 10 is disposed in the output oil pressure chamber $11_2$ so as to cooperate with the valve seat 12. The large-diameter valve rod 8 extends through the inlet oil pressure chamber $11_1$ and slidably supported by the housing 2, while the small-diameter valve rod 9 extends through a later-mentioned balancing piston 15 into the second control pressure chamber $6_2$. A spring 13 disposed in the inlet oil pressure chamber $11_1$ is preloaded with a predetermined set load so as to bias the pressure receiving pistion 7 away from the valve seat 12, i.e. in the opening direction of the piston valve 10.

The opening position of the piston valve 10 is limited by the abutment of the pressure receiving piston 7 with a step $11_2a$ of the output oil pressure chamber $11_2$. Thus, the piston valve 10, valve seat 12 and the spring 13 in combination constitute a reducing valve $V_1$.

The second control pressure chamber $6_2$ is divided into an inlet oil pressure chamber $22_1$ communicating with the second inlet port $3_2$ and an outlet oil pressure chamber $22_2$ communicating with the second outlet port $4_2$ by a valve seat member 14 disposed at an intermediate portion thereof. A ball valve 16 for cooperating with a valve seat 14a of the valve seat member 14 and a valve spring 17 for urging the ball valve 16 into engagement with the valve seat 14a are accommodated in the inlet oil pressure chamber $22_1$. The valve seat member 14, ball valve 16 and the valve spring 17 in combination constitute a cut-off valve $V_2$. The small-diameter valve rod 9 has a push rod 19 of a smaller diameter projecting from the end thereof. The push rod 19 is received by the valve port 18 of the valve seat 14a so as to be able to drive the ball valve 16 in the opening direction.

The stroke of movement of the piston valve 10, i.e. the distance between the position at which the piston 7 abuts the step $11_2a$ and the position at which the same contacts the valve seat 12 is represented by $S_1$, whereas the stroke of the ball valve 16, i.e. the distance between a position at which the ball valve 16 starts to open as a result of abutment by the push rod 19 and the position at which the same contacts the valve seat 14a is represented by $S_2$. The following relationship is preserved between the strokes $S_1$ and $S_2$.

$$S_1 > S_2$$

A cylinder bore 23 having an end wall 23a is connected to one end of the output oil pressure chamber $22_2$. A communication bore 5 communicating with the output oil pressure chamber $11_2$ opens in the end wall 23a. A balance piston 15 slidably fits in the cylinder bore 23. The small-diameter valve rod 9 slidably extends through the axial portion of the piston 15. A return spring 21 for biasing the balance piston 15 toward the end wall 23a is accommodated by the output oil pressure chamber $22_2$ is compressed condition, so that the balance piston is normally kept in contact with the end wall 23a by the action of the return spring 21.

The embodiment having such a construction as described above operates in a manner explained hereinbelow.

Figure 2:
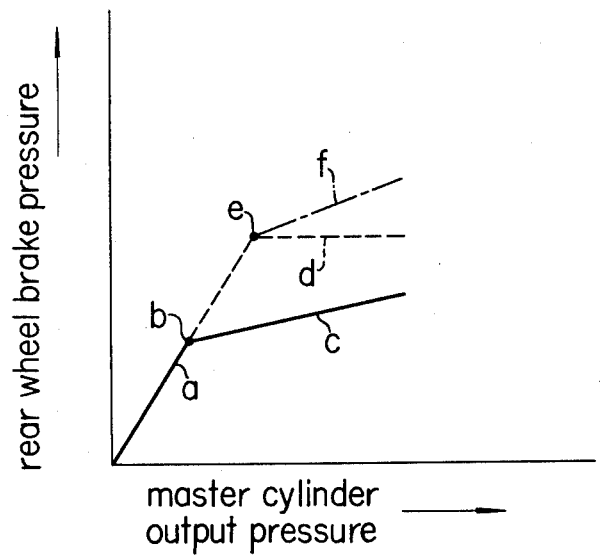
FIG. 2 is a graph showing the relationship between the output hydraulic pressure of the master cylinder and the braking hydraulic pressure for rear wheel brakes.

As the master cylinder M is put into operation as a result of depression of the brake pedal 1 during running of the vehicle, hydraulic pressures are delivered from the first and the second output ports $P_1P_2$. The output pressure from the first output port $P_1$ is applied through the oil passages $L_1f$ and $L_1r$ to the right front wheel brake $Bf_2$ and left rear wheel brake $Br_1$ to actuate these brakes. Meanwhile, the output pressure from the second output port $P_2$ is transmitted through the oil passages $L_2f$ and $L_2r$ to the left front wheel brake $Bf_1$ and right rear wheel brake $Br_2$, respectively, to actuate these brakes (See curve a in FIG. 2)

Then, as the output pressures from the first and second output ports $P_1,P_2$ of the master cylinder M are increased beyond predetermined levels, the pressure reducing valve $V_1$, cut-off valve $V_2$, balance piston 15 and so forth cooperate to commence the control of fluid pressures in the left and right rear wheel brakes $Br_1$ and $Br_2$.

More specifically, in the first control pressure chamber $6_1$, a hydraulic pressing force is exerted on the pressure receiving piston 7 to press the latter to the right as viewed in the drawing, due to the difference of the pressure receiving areas A and B, i.e. the difference represented by $Sa_1-Sa_2$. Also, in the second control pressure chamber $6_2$, a force is applied in the same direction to the small-diameter valve rod 9 having a pressure receiving area of $Sa_1$. As the sum of these forces comes to exceed the set load of the spring 13, the piston valve 10 starts to move to the right. As the movement of the piston valve 10 reaches $S_1$, the pressure receiving piston 7 is seated on the valve seat 12 so as to break the communication between the output pressure chambers $11_1,11_2$ of the first control pressure chamber $6_1$, as shown in FIG. 2b.

Thereafter, as the output pressures from the first and the second output ports are further increased, the hydraulic pressure of the input oil pressure chamber $11_1$ acting on the pressure receiving surface B of the pressure receiving piston 7 is also increased to generate a force which biases the piston valve 10 to the left to slightly move the pressure receiving piston 7 away from the valve seat 12 to establish again the mutual communication between the output oil pressure chambers $11_1$ and $11_2$ so that the braking fluid pressure in the left rear wheel brake $Br_1$ is increased.

As a result of this increase of pressure, the rightward pressing force due to the difference of pressure receiving areas of surfaces A and B of the pressure receiving piston 7 is increased without delay, so that the piston valve 10 is moved again to the right to seat the pressure-receiving piston 7 on the valve seat 12. This operation is repeated at a high frequency as the output pressure from the first output port $P_1$ is further increased, so that the output pressure from the first output port $P_1$ of the master cylinder M is transmitted to the left rear wheel brake $Br_1$ while being reduced proportionally. (See curve c of FIG. 2).

As the piston valve 10 of the pressure reducing valve $V_1$ travels a distance $S_1$ from the opening position to the closing position, the ball valve 16 of the cut-off valve $V_2$ is released from the pressure given by the push rod 19, due to the relation of $S_1 > S_2$, and is seated on the valve seat 14a by the biasing force of the valve spring 17 thereby to close the valve port 18 before the seating of piston 7 on seat 12. In consequence, the communication between the input and output oil pressure chambers $22_1,22_2$ of the second control pressure chamber $6_1$ is interrupted. This state of interruption is maintained even during the pressure reducing operation of the piston valve 10. In consequence, the hydraulic pressure in the output oil pressure chamber $11_2$ of the first control pressure chamber $6_1$ is increased due to the action of the piston valve 10 to exceed the pressure in the output oil pressure chamber $22_2$ so that the balance piston 15, which receives both pressures at its both sides, is slided toward the output oil pressure chamber $22_2$ due to the difference of the pressure. The movement of the balance piston 15 is stopped when an equilibrium state is established between both pressures of the output oil pressure chambers $11_1,11_2$. As a result, the pressure in the output oil pressure chamber $22_2$ of the second control pressure chamber $6_2$ follows the pressure in the output oil pressure chamber $11_2$ of the first control pressure chamber $6_1$, so that the braking fluid pressure in the right rear wheel brake $Br_2$ increases in the same characteristic as the left rear wheel brake $Br_1$. (See curve c in FIG. 2)

The dual hydraulic brake system operates in the manner explained above, provided that there is no failure in the hydraulic circuit to ensure correct operation of all brakes $Bf_1, Bf_2, Br_1$ and $Br_2$.

It is assumed here that a failure has taken place in the system associated with the first output port $P_1$ to cause a trouble only in the oil passages $L_1f$ and $L_1r$, to make the right front wheel brake $Bf_2$ and the left rear wheel brake $Br_1$ inoperative, the output pressure from the first output port $P_1$ is not applied to the first control pressure chamber $6_1$ during the braking, but the output pressure from the second output port $P_2$ acts in the second control pressure chamber $6_2$. As the output pressure from the second output port $P_2$ is increased, the force acting on the end surface of the small-diameter valve rod 9 of the piston valve 10 to the right as viewed in the drawings overcomes the seat load of the spring 13, so that the piston valve 10 is moved to the right to bring the cut-off valve to the closing position. In consequence, the increase of the braking fluid pressure in the right rear wheel brake $Br_2$ is limited. Namely, in this state, the cut-off valve $V_2$ acts as a limiter. (See curve d in FIG. 2) The limit point e of the pressure increase is determined by the cross-sectional area $Sa_2$ of the small-diameter valve rod 9 and the set load of the spring 13. Since there is a relationship expressed by $Sa_1 \div 2 \times Sa_2$ as mentioned before, the force of hydraulic pressure for overcoming the set load of the spring 13 acts on an area which is about ½ of that in the normal state. In consequence, the limit point e is about two times as high as the pressure at which the pressure reducing operation is commenced in the normal state, i.e. the point b in FIG. 2, so that the right rear wheel brake $Br_2$ makes a braking effect greater than that in the normal state, thereby to provide a braking and deceleration of the vehicle which is almost equivalent to that obtained in the normal state, compensating for the shortage of the braking force due to the operation failure of the left rear wheel brake $Br_1$.

To the contrary, assuming that the failure has taken place only in the oil passages $L_2f$ and $L_2r$ associated with the second output port $P_2$ to make the left front wheel brake $Bf_1$ and right rear wheel brake $Br_2$ inoperative, the output pressure from the second output port $P_2$ of the master cylinder M does not apply to the second control pressure chamber $6_2$ during the braking, while the output pressure from the first output port $P_1$ acts in the first control pressure chamber $6_1$. Then, as the set load of the spring 13 is overcome by the rightward force generated by the increased output pressure from the first output port $P_1$ acting on the pressure receiving surface A of the pressure receiving piston 7, the piston valve 10 is moved to the right to make the pressure receiving piston 7 be seated on the valve seat 12. In this case, the pressure at which the pressure reducing operation is commenced is determined by the difference of pressure-receiving area, i.e. the difference $Sa_1 - Sa_2$ between the cross-sectional areas of the large and small-diameter valve rods 8 and 9, and by the set load of the spring 13. However, since there is a relationship expressed by $Sa_1 \div 2 \times Sa_2$ as mentioned before, the force generated by the hydraulic pressure for overcoming the set load of the spring 13 acts on an area which is about ½ of that in the normal state. Thus, the pressure at which the pressure reducing operation is commenced is about two times as high as that in the normal state, as in the case of the failure in the system connected to the first output port $P_1$ in which the pressure reduction is commenced at point e. It is, therefore, possible to obtain a substantially equal deceleration effect as that in the normal state.

After the commencement of the pressure reducing operation, the piston valve 10 acts to transmit the output pressure from the first output port $P_1$ to the left rear wheel brake $Br_1$ while proportionally reducing the output pressure. In consequence, the pressure transmitted to the left rear wheel brake $Br_1$ is increased along an inclined curve f in FIG. 2.

As has been described, according to the invention, there is provided a braking hydraulic pressure control valve device which comprises: a valve housing having a first and a second inlet ports communicating with a first and second output ports of the master cylinder, respectively, a first and a second outlet ports communicated with the left and right rear wheel brakes of a vehicle, respectively, a first control pressure chamber interconnecting the first inlet port and the first outlet port, a second control pressure chamber interconnecting the second inlet port and the second outlet port, and a cylinder bore interconnecting the first and the second outlet ports; a pressure reducing valve adapted to normaly open the first control pressure chamber and to open and close the first control pressure chamber as the pressure at the first inlet port exceeds a predetermined level so as to transmit the pressure to the first outlet port while proportionally reducing the pressure; a cut-off valve adapted to normally open the second control pressure chamber in the normal state, the cut-off valve being so related to the pressure reducing valve that it closes the second control pressure chamber immediately upon or just before the closing of the pressure reducing valve; and a balance piston slidably fitting in the cylinder bore and adapted to move, when the pressure at the first outlet port is higher than that at the second outlet port, in the direction for achieving an equilibrium of these pressures.

Therefore, only one expensive pressure reducing valve is used, and the cut-off valve and the balance piston have simple constructions as compared with the reducing valve, so that the construction of the braking apparatus as a whole is much simplified and the cost of the same is considerably lowered. In addition, thanks to the cooperation of the reducing valve, cut-off valve and the balance piston, it is possible to transmit the output pressures from the master cylinder to the left and right rear weel brakes independently, while proportionally reducing the pressures and maintaining the equilibrium state of these pressures, thereby to ensure a good braking effect.

What is claimed is

1. A hydraulic pressure control valve device of hydraulic brake system for vehicles comprising:

a valve housing having a first inlet port and a second inlet port communicating with a first outlet port and a second output port of a master cylinder, respectively, a first outlet port and a second outlet port communicating with a left rear wheel brake and a right rear wheel brake of the vehicle, respectively;

a first control pressure chamber defined in said valve housing for connection between said first inlet and outlet ports;

a second control pressure chamber defined in said valve housing for connection between said second inlet and outlet ports;

a cylinder bore defined in said valve housing for connection between said first and second outlet ports;

a pressure reducing valve adapted to normally open said first control pressure chamber in the normal state and to repeatedly open and close said first control pressure chamber when the pressure at said first inlet port is raised beyond a predetermined level, thereby to transmit said first inlet port pressure to said first outlet port at a proportionally reduced rate, said reducing valve including an input oil pressure chamber communicating with said first inlet port, an output oil pressure chamber communicating with said first outlet port, a valve seat separating said input oil pressure chamber and said output oil pressure chamber from each other, a piston valve having a pressure receiving piston disposed in said output oil pressure chamber, said pressure receiving piston being formed at its opposite sides with a pair of pressure-receiving surfaces of different areas and cooperating with said valve seat for controlling communication between said output and input oil pressure chambers, and a spring means for biasing said piston valve in the opening direction relative to said valve seat;

a cut-off valve adapted to normally open said second control pressure chamber in the normal state and so associated with said pressure reducing valve as to close said second control pressure chamber immediately upon or before the closing of said pressure reducing valve; and a balance piston slidable in said cylinder bore and adapted to move, when the pressure at said first outlet port is higher than the pressure at said second outlet port, in the direction to achieve an equilibrium of these pressures;

the improvement comprising a valve rod integrally connected to said pressure receiving piston and projecting into said second control pressure chamber to act directly on said cut-off valve for opening and closing thereof.

2. A hydraulic pressure control valve device of hydraulic brake system for vehicles as claimed in claim 1, wherein said balance piston is disposed so as to be clamped between said first and second control pressure chambers, and wherein said valve rod of said piston valve extends slidably through said balance piston.

3. A hydraulic pressure control valve device of hydraulic brake system for vehicles as claimed in claim 1, wherein said cut-off valve includes a second input oil pressure chamber communicating with said second inlet port, a second output oil pressure chamber communicating with said second outlet port, a valve seat separating from said second input oil pressure chamber and said second output oil pressure chamber from each other, a valve member disposed in said second output oil pressure chamber and adapted to cooperate with said valve seat, and a valve spring adapted to bias said valve member in the closing direction, said valve member being operatively opposed by said valve rod of said piston valve.

4. A hydraulic pressure control valve device of hydraulic brake system for vehicles as claimed in claim 1, wherein said piston valve includes a large-diameter valve rod projecting from one end surface of said pressure receiving piston through said output oil pressure chamber so as to be slidably carried by said valve housing, and a small-diameter valve rod projecting from the other end surface of said pressure receiving piston into said second control pressure chamber to actuate said cut-off valve, the cross-sectional area of said large-diameter valve rod being selected to be about twice as large as that of said small-diameter valve rod.

5. A hydraulic pressure control valve device of hydraulic brake system for vehicles as claimed in claim 1, wherein said cylinder bore is provided at its side adjacent to said first control pressure chamber with an end wall for limiting the normal stopping position of said balance piston, said balance piston being biased by means of a spring toward said end wall.

* * * * *